(12) United States Patent
Cevahir et al.

(10) Patent No.: US 9,388,527 B2
(45) Date of Patent: Jul. 12, 2016

(54) SPINFINISH MATERIAL APPLIED ON THE FIBER AND A PRODUCTION METHOD THEREOF

(71) Applicant: KORDSA GLOBAL ENDUSTRIYEL IPLIK VE KORD BEZI SANAYI VE TICARET ANONIM SIRKETI, Izmit (TR)

(72) Inventors: Nacide Nurcin Cevahir, Izmit (TR); Yusuf Ziya Menceloglu, Istanbul (TR); Ilhan Ozen, Kayseri (TR)

(73) Assignee: KORDSA GLOBAL ENDUSTRIYEL IPLIK VE KORD BEZI SANAYI VE TICARET ANONIM SIRKETI, Kocaeli (TR)

( * ) Notice: Subject to any disclaimer, the term of this patent is extended or adjusted under 35 U.S.C. 154(b) by 0 days.

(21) Appl. No.: 14/646,732

(22) PCT Filed: Nov. 29, 2013

(86) PCT No.: PCT/IB2013/060505
§ 371 (c)(1),
(2) Date: May 21, 2015

(87) PCT Pub. No.: WO2014/091354
PCT Pub. Date: Jun. 19, 2014

(65) Prior Publication Data
US 2015/0299940 A1    Oct. 22, 2015

(30) Foreign Application Priority Data
Dec. 12, 2012    (TR) ............................... a 2012 14554

(51) Int. Cl.
| | | |
|---|---|---|
| *D06M 15/53* | (2006.01) | |
| *C08G 18/71* | (2006.01) | |
| *D06M 15/568* | (2006.01) | |
| *D01F 11/08* | (2006.01) | |
| *C08G 18/48* | (2006.01) | |
| *D06M 101/32* | (2006.01) | |

(52) U.S. Cl.
CPC ............ *D06M 15/53* (2013.01); *C08G 18/4837* (2013.01); *C08G 18/718* (2013.01); *D01F 11/08* (2013.01); *D06M 15/568* (2013.01); *D06M 2101/32* (2013.01); *D06M 2200/50* (2013.01)

(58) Field of Classification Search
CPC ............ C08G 18/718; C08G 18/4837; D06M 15/568; D06M 15/53; D06M 2200/50; D06M 2101/32; D01F 11/08
See application file for complete search history.

(56) References Cited

U.S. PATENT DOCUMENTS

| | | |
|---|---|---|
| 3,642,518 A | 2/1972 | Miki et al. |
| 3,793,425 A | 2/1974 | Arrowsmith |
| 3,803,035 A | 4/1974 | Bhakuni et al. |
| 4,054,634 A | 10/1977 | Marshall et al. |
| 4,348,517 A | 9/1982 | Chakravarti |
| 4,397,985 A | 8/1983 | Marshall et al. |
| 2010/0209612 A1 | 8/2010 | Rong et al. |

*Primary Examiner* — Anthony J Green
(74) *Attorney, Agent, or Firm* — Gokalp Bayramoglu

(57) ABSTRACT

The present invention relates to a spinfinish material and a production method thereof which comprises the steps of synthesizing the active compound (11), heating polymer (111), adding initiator (112), adding catalyst (113), performing the reaction (114), preparing the improving material (12), adding the improving material into the active component (13), obtaining the spinfinish material (14); which is applied on fiber during production of polymer fibers used as reinforcing material in tire technology, both improves the physical properties of fiber and makes the cord-rubber adhesion easier.

4 Claims, 1 Drawing Sheet

SPINFINISH MATERIAL APPLIED ON THE FIBER AND A PRODUCTION METHOD THEREOF

FIELD OF THE INVENTION

The present invention relates to a spinfinish material which is applied on fiber during production of polymer fibers used as reinforcement material in tire technology, both improves the physical properties of the fiber and cord-rubber adhesion, and a production method thereof.

BACKGROUND OF THE INVENTION

Today, the polyethyleneterephthalate (PET) with high tenacity decreases the deformation of the composite structure it forms with the rubber significantly with its high strength and low elongation properties, thus material with higher performance can be produced. The PET fiber is most commonly used in tire, hose, components such as conveyor band and belt as rubber reinforcement material.

The synthetic fibers are hard to adhere to rubber without binding agents in between them because they have a very smooth surface and low reactivity. The low surface activity of the fibers stems from the low polarity and low reactivity of the polymer molecules. Therefore, adhesives are used in intermediate surfaces since the physical and chemical bonding between the rubber and cord fabric used in the tire production technology is very low. Adhesives vary according to the type of the polymer used in cord fabric.

Since the elongation of cord fabric material is low and its strength is high, and the elongation of the rubber material is high and its strength is low; the adhesive which is used should provide an excellent intermediate surface in order to provide the best performance. Increasing adhesiveness provides better compatibility between the rubber and the cord fabric, and enables the properties of both rubber and cord fabric to be revealed better in the final product.

As it is in reinforcing materials such as nylon, rayon, aramide; an adhesive should be applied in order that the PET cords are adhered to the rubber. In cord fabric production, water based Resorcinol-Formaldehyde-Latex (RFL) adhesive solutions enabling the cord fabric to rubber have been used for over fifty years. In RFL adhesive solutions, caustic and ammoniac are the most commonly used catalysts. In the said solutions, different Formaldehyde/Resorcinol (F/R) mol ratios, resin/latex ratios, solid ratios and additional activating chemicals are used for especially PET fiber.

Whereas the adhesion of fibers such as nylon and rayon are easy to adhere to the rubber with RFL, there are difficulties in adhesion of PET fiber to the rubber. The main reason for this is that functional groups such as carboxyl (COOH) and hydroxyl (OH) forming bonds with the RFL are only present on chain ends of PET molecule in structure of PET fiber. In nylon and rayon material, the density of the functional groups is much higher than in the PET fiber. For this reason, the adhesive systems of PET fibers are continuously developed. One of the said methods is to develop spinfinish materials that will increase the surface activity of PET fiber with RFL applied during yarn production.

Spinfinish materials are mostly liquid compositions which are comprised of more than one components and wherein all components are in equilibrium. Applying spinfinish material which is a very important part of fiber production procedure provides various properties to the fibers, as well as provides ease by forming intermediate surface between the fiber surface and the metal and/or ceramic components present in the production procedure.

The main functions of the spinfinish material are to provide lubrication by greasing the fiber surface, to prevent abrasions by minimizing the friction between filament-filament, filament-metal and filament-ceramic, to provide antistatic properties to the fiber, and to prevent the fiber from falling apart by keeping the hundreds of filaments forming the fiber. During the production of synthetic fibers used as rubber reinforcing material and produced in high speeds, spinfinish is applied on the fibers coming out of spinnerets in order to drawability of the fiber. It is not possible to produce fiber with high performance in high speeds without spinfinish. The said spinfinish material is used for providing drawability in nylon 6.6 fibers, whereas it is also used to activate the surface of the fiber besides the said property in PET fiber production.

The spinfinish which has a very important role in production of fibers with high performance causes many problems in spinning, drawing and twisting processes when they are not compatible with the system it is used with. These can be breakage in fiber, filamentation, winding in drawing cylinders and irregularity in reel form, being smoked, tar forming which cannot be cleaned, unevenness in the reel form, deteriorations in twisting quality and ruptures. For this reason, the spinfinish material used for producing fiber with high quality should have some main properties.

High decomposition temperature, high smoking temperature, optimum viscosity, antistaticity, not leaving residue on the metal/ceramic components, low volatility are among the expected major properties. Besides, the spinfinish which is used being harmless to the environment and human's health, providing emulsion quality in aqueous solution, being resistant to the temperature in process conditions, not experiencing chemical reactions, not being oxidized in storage conditions and being low cost also provide advantage in production of fibers.

U.S. Pat. No. 4,348,517, an application known in the state of the art, discloses a spinfinish composition applied in two stages on PET fiber. The said composition is stated to be comprised of triglycidyl glycol ether and epoxy silane.

U.S. Pat. No. 3,803,035, another application known in the state of the art, discloses a spinfinish composition comprised of lubricant, antistatic agent, emulsifier and polyepoxy.

U.S. Pat. No. 3,793,425, another application known in the state of the art, discloses coating PET fiber with a solution comprised of epoxy resin buffered with potassium carbonate sodium carbonate or ammonium hydroxide.

U.S. Pat. No. 4,054,634, another application known in the state of the art, discloses a two stage spinfinish application. Spinfinish applied in first stage comprises polyethyleneoxide-polypropyleneoxide (EO-PO) monoethers, whereas in spinfinish composition applied in second stage compositions comprising catalysts such as epoxy silane and sodium hydroxide, potassium hydroxide, sodium carbonate, potassium carbonate, sodium acetate, potassium acetate are disclosed.

The compositions disclosed in the said methods are high cost and/or harmful to environment. Most part of them cannot provide the desired adhesion between the fiber and rubber and the strength. Furthermore, there is no study for applying spinfinish on fiber in single stage during the production of fiber.

SUMMARY OF THE INVENTION

The objective of the present invention is to provide a spinfinish material which can be applied in single stage on fiber and which can be applied as water based emulsion.

Another objective of the present invention is to provide a spinfinish material which has a high smoking temperature and is applied on fiber.

A further objective of the present invention is to provide a spinfinish material which does not leave residue when it is applied on fiber.

Another objective of the present invention is to provide a spinfinish material which improves the adhesion between cord-rubber in tire technology when it is applied on fiber used in cord production.

Yet another objective of the present invention is to provide a production method of a spinfinish material which is low cost, applied on fiber and have the properties mentioned above.

BRIEF DESCRIPTION OF DRAWINGS

A spinfinish material applied on fiber and a production method thereof developed to fulfill the objective of the present invention is illustrated in the accompanying figure, in which.

DETAILED DESCRIPTION OF THE INVENTION

Figure 1:
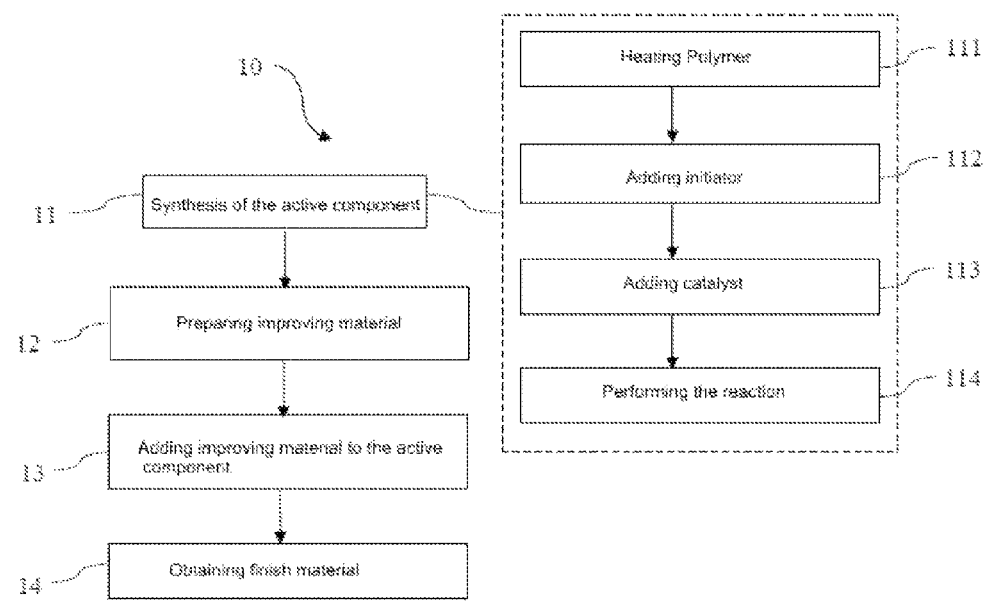
FIG. 1 is the view of the flowchart of the method.

The production method for the spinfinish material applied on fiber (10) developed to fulfill the objective of the present invention comprises the steps of
  synthesis of the active component (11),
    heating the polymer (111),
    adding initiator (112),
    adding catalyst (113),
    performing the reaction (114),
  preparing the improving material (12),
  adding the improving material to the active component (13),
  obtaining the spinfinish material (14).

In the inventive production method for a spinfinish material applied on fiber (10), first the active component is synthesized (11). For this purpose, first the polymer is placed inside the reactor and preheated in there (111). In the preferred embodiment of the invention, ethyleneoxide-propyleneoxide copolymer (EO-PO) (block and/or graft copolymers) the number-average molecular weight of which is between 1000 and 5000 g/mole is used. In the preferred embodiment of the invention, the process of heating the polymer (111) is performed when the reactor temperature is in the range of 60-100° C.

When the temperature of the reactor reaches the desired value, the initiator is added dropwise (112). In the present invention, 3-isocyanatopropyl-triethoxy silane (IPTS) is used as initiator. The ratios of EO-PO copolymer and IPTS added inside the reactor can be between 1:1 and 1:2.

After the initiator is added (112), the catalyst which will catalyze the reaction is added inside the reactor (113). In the present invention, tin 2-ethylhexanoate is used as catalyst. The reaction started with adding the catalyst (113) continues for 9-24 hours under nitrogen atmosphere (114).

Then the improving materials are added to the active component (13) formed as a result of the reaction (114), and the spinfinish material is obtained in this way (14). The improving materials are prepared with lubricant in ratio of % 30-60 by weight, emulsifier in ratio of % 30-50, antistatic agent in ratio of % 1-10, wetting agent in ratio of % 1-10, antioxidant in ratio of % 0-2, surface activating agents in ratio of % 1-5, bacteria preventing agents, corrosion inhibitors and anti-foams (12).

In the preferred embodiment of the invention, the ratio of the active component in the spinfinish material which is obtained is between % 20 and % 60 by weight. When the spinfinish material obtained after all the steps, the adhesion between the cords used in tire technology with the rubber is reinforced.

The inventive method for producing spinfinish material applied on fiber (10) is performed in bulk medium and the product formed as the reaction proceeds with FTIR analysis. EO-PO copolymer, the water of which is previously removed and the number-average molecular weight of which is between 1000 and 5000 g/mole, is placed into the reaction balloon, and 3-isocyanatopropyl-triethoxy silane (IPTS) is added dropwise when the ambient temperature reaches 80° C. After that, tin 2-ethylhexanoate is added and the reaction is performed under nitrogen atmosphere. The schematic view of the reaction is as follows:

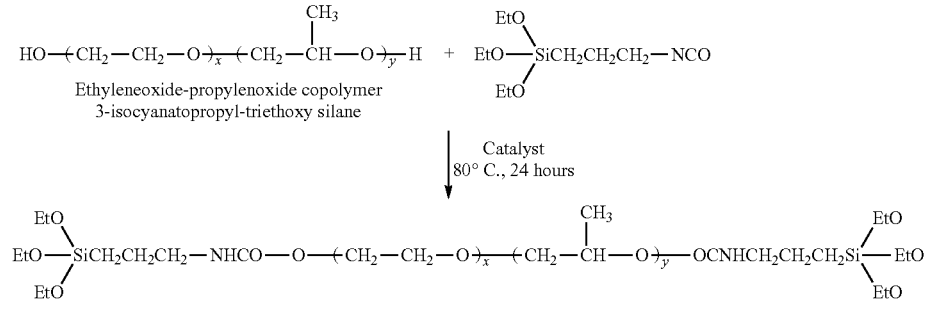

The inventive activating component

Figure 2:
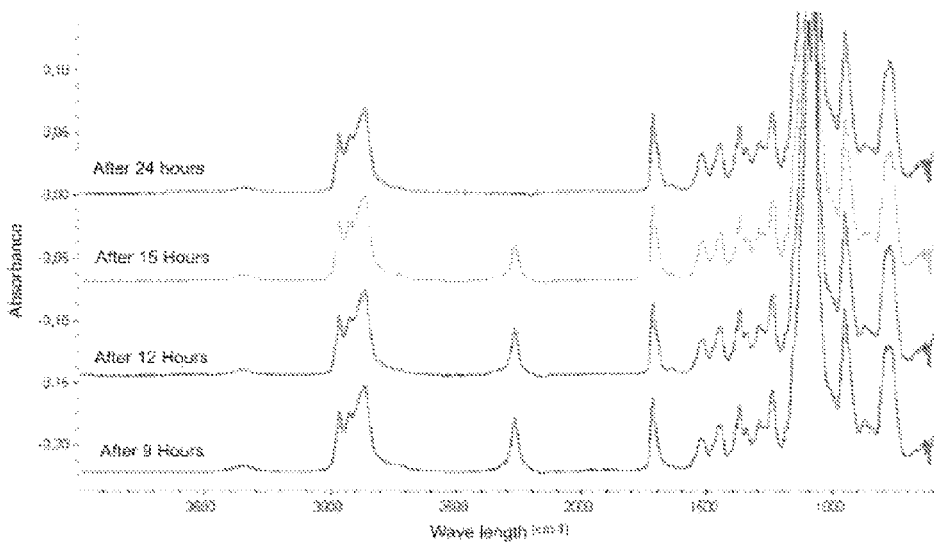
FIG. 2 is the view of the FITR spectrums of the samples taken from the reaction medium in different times during the synthesis of active component, and comprising EO-PO and IPTS in ratio of 1:2.

After the reaction started, samples were taken from the reaction medium after 9, 12, 15 and 24 hours, it was followed with FTIR analysis whether the reaction was completed. The FTIR spectrums of the samples taken in different times from the reaction medium are as in FIG. 2: When the reaction is completed, the band of the isocyanate group at 2200 and 2353 $cm^{-1}$ present in the IPTS (N=C=O) completely disappears, instead a band belonging to urethane group at 1718 $cm^{-1}$ (NHCOO) wavelength is seen. As a result of the optimizations, reaction times are determined as 24 hours for 1:2 ratio (the ratio of the polymer to the initiator), and 9 hours for the ratio of 1:1.

3 different spinfinish materials comprising active component in ratios of % 20, % 40, and % 60 by mass (respectively spinfinish-1, spinfinish-2, spinfinish-3) were prepared, and all used materials and the ratios in the composition are given below in Table 1.

TABLE 1

The Compound of Spinfinish compositions

| Spinfinish-1 Weight % | Spinfinish-2 Weight % | Spinfinish-3 Weight % | Spinfinish Formula Name of the component | Function |
|---|---|---|---|---|
| 20 | 40 | 60 | AB | Active component |
| 26 | 22 | 18 | Emulgin RT40 (Castor oil) | Lubricant and emulsifier |
| 11 | 7 | 3 | Dehydol LS6 (5 mol ethoxylated alcohol C12-C14) | Emulgator |
| 11 | 7 | 3 | Dehydol LT7 (7 mol ethoxylated alcohol C12-C14) | Emulgator |
| 21 | 17 | 13 | Rinalit SMO (Sorbitan monooleate) | Cohesion agent |
| 11 | 7 | 3 | Crafol 56 (phosphate ester) | Antistat |

Spinfinish-1: spinfinish with 20% active component
Spinfinish-2: spinfinish with 40% active component
Spinfinish-3: spinfinish with 60% active component some physical properties of these 3 different prepared spinfinish material were measured and the said values are given below in Table 2.

TABLE 2

Some physical properties of spinfinish compositions

| Properties | Spinfinish-1 | Spinfinish-2 | Spinfinish-3 |
|---|---|---|---|
| Viscosity (cP) (at 25° C.) | 390 | 990 | 1040 |
| Smoking point (° C.) | 152 | 152 | 172 |
| Degradation temperature ($T_{1/2}$) (a) | 362 | 376 | 392 |
| Residue (%) (at 600° C.) | 5 | 7 | 8 |

TGA measurements were performed at range of 25° C.-600° C. in oxygen environment at 20° C./min heating rate.

The inventive spinfinish material can also be applied on fibers such as polyethylene terephthalate, polyethylene naphthalate, and other fibers that can bond with RFL similar to these in terms of surface properties.

In order to apply the inventive spinfinish material comprising active component, first the water based emulsion of the material is prepared. The concentration of the water based emulsions which are prepared is 5% by weight, is applied after the 1100 dtex synthetic, continuous, high modulus, low shrinking (HMLS) PET fibers go out of the spinnerets at high speeds.

After the fibers on which spinfinish material is applied are prepared in certain structures (dtex*layer*twist), dipping process is performed, and they are used in cord production. In order to adhere the said cords to the rubber, they should be dipped into water based adhesive solutions. Dipping solution is comprised of two different solutions. First solution comprises polyepoxy and/or blocked polyisocyanate. The solid amount of the first adhesive dipping solution varies between 0.5% and 5%. The second is comprised of Resorcinol-Formaldehyde-Latex (RFL). The latexes which are used are VP (vinyl pyridine-styrene-butadiene ter polymer) and SBR (styrene-butadiene copolymer) latexes. The solid amount of the water based RFL solution can vary between 3% and 30%. pH range of RFL is kept between 8 and 12. After the cords are dipped, drying and curing processes are performed. Drying is performed at 100-150° C., and curing is performed at 210-250° C. The cords which are dipped are pressed with unvulcanized rubber compositions. The said composite material is cured under press for 20 minutes at 170° C.

The preparation of an exemplary spinfinish material and application on fiber is explained below.

EXAMPLE

In a medium not comprising solution (bulk), after the 60 g Synalox EO-PO copolymer, the water of which is removed previously and the molecular weight of which is 1000 g/mole, is placed into the reactor, when the ambient temperature reaches 80° C., 31.24 g IPTS is added dropwise, and then the reaction is performed in nitrogen atmosphere by adding a drop of tin 2-ethylhexanoate. The synthesized active component can be prepared with different ratios given in Table 1 with other components of the spinfinish.

While applying the material on the fiber, water based emulsion solution is prepared with spinfinish material comprising 40% active component. The concentration of the emulsion solutions which are prepared is 5%, they are applied on 1100 dtex HMLS PET fiber at high speeds in one stage. 1100 dtex PET fibers which are treated with spinfinish material, the adhesion activating component of which is 40% in the formulation, are twisted in sizes of 1100×2 470×470, and the cord is produced. The twisted cords first were treated with adhesive comprising 3% epoxy-blocked isocyanate, and then treated with 20% solid standard RFL solution, dried at 140° C. for 110 seconds, and then cured at 235 and 225° C. for 55 seconds for each. Some physical properties of the obtained yarn are given in Table 3.

TABLE 3

The physical properties of PET fiber treated with exemplary spinfinish material comprising active component in ratio of 40% by weight.

| Properties | Reference Product | Spinfinish-2 |
|---|---|---|
| Yarn/Ceramic friction coefficient @100 m/min | 0.49 | 0.46 |
| Yarn/Yarn friction coefficient @100 m/min | 0.38 | 0.33 |
| Yarn-Breaking strength (kg) | 8.03 | 8.08 |
| Twisted Cord-Breaking strength (kg) | 14.72 | 14.70 |
| % conversion (a) | 92 | 91 |
| Produced cord breaking.strength (kg) | 14.5 | 14.8 |
| H-adhesion (kg) (b) | 100 | 111 |

(b) conversion calculation:
Raw yarn strength: 8.03 kg
Twisted cord strength: 14.72 kg
% conversion: 14.72/(2×8.03)×100=92
(b) Dipping solution-1: Comprising adhesion improving activator (epoxy-isocyanate)
Dipping solution-2: RFL solution
The reference product is an oil product used in the state of the art, it is in the know-how scope of the oil producers.

The invention claimed is:

1. A method for producing spinfinish material comprising the steps of:
   synthesizing of an active component, wherein the active component is prepared with different ratios of spinfinish material;
   heating a polymer to 60-100° C.;
   adding an initiator dropwise into a reactor when the reactor reaches a suitable temperature for heating the polymer;
   adding a catalyst;
   performing a reaction;
   preparing an improving material;
   adding the improving material to the active component;
   obtaining a spinfinish material;
   wherein the polymer is ethyleneoxide-propylenoxide (EO-PO) with a number-average molecular weight between 1000 and 5000;
   wherein the indicator is 3-isocyanatopropyl-triethoxy silane (IPTS)
   wherein tin 2-ethylhexanoate is used as the catalyst;
   wherein during the step of synthesizing of the active component, the ratios of EO-PO copolymer and IPTS added inside the reactor is between 1.1 and 1:2;
   wherein the improving material is 30-60% by weight lubricant, 30-50% by weight emulsifier, 1-10% by weight antistatic agent, 1-10% by weight wetting agent, 0-2% by weight antioxidant, 1-5% by weight surface activating agents, 0-5% by weight bacteria preventing agent, 0-5% by weight corrosion inhibitor, and 0-5% by weight anti-foaming material.

2. The method for producing spinfinish material according to claim 1, wherein the step of performing the reaction is continued for 9-24 hours under nitrogen atmosphere.

3. The method for producing spinfinish material according to claim 1, wherein the step of preparing the improving material is prepared with a lubricant in ratio of 30-60% by weight, an emulsifier in ratio of 30-50%, an antistatic agent in ratio of 1-10%, a wetting agent in ratio of 1-10%, an antioxidant in ratio of 0-2%, a plurality of surface activating agents in ratio of 1-5%, a plurality of bacteria preventing agents, a plurality of corrosion inhibitors and a plurality of anti-foams.

4. The method for producing spinfinish material according to claim 1, wherein during the step of adding the improving material into the active component, the ratio of the active component in the spinfinish material is 20-60% by weight.

* * * * *